(12) United States Patent
Kagei et al.

(10) Patent No.: US 8,728,343 B2
(45) Date of Patent: May 20, 2014

(54) POSITIVE ELECTRODE ACTIVE MATERIAL FOR LITHIUM-ION BATTERY AND LITHIUM-ION BATTERY

(75) Inventors: Shinya Kagei, Takehara (JP); Keisuke Miyanohara, Takehara (JP); Yoshimi Hata, Takehara (JP); Yasuhiro Ochi, Takehara (JP)

(73) Assignee: Mitsui Mining & Smelting Co., Ltd. (JP)

( * ) Notice: Subject to any disclaimer, the term of this patent is extended or adjusted under 35 U.S.C. 154(b) by 0 days.

(21) Appl. No.: 13/635,922

(22) PCT Filed: Mar. 30, 2011

(86) PCT No.: PCT/JP2011/058037
§ 371 (c)(1),
(2), (4) Date: Nov. 14, 2012

(87) PCT Pub. No.: WO2011/122663
PCT Pub. Date: Oct. 6, 2011

(65) Prior Publication Data
US 2013/0134349 A1 May 30, 2013

(30) Foreign Application Priority Data
Mar. 30, 2010 (JP) .................................. 2010-079171

(51) Int. Cl.
*H01M 4/505* (2010.01)
(52) U.S. Cl.
USPC ..................................................... 252/182.1
(58) Field of Classification Search
USPC ..................................................... 252/182.1
See application file for complete search history.

(56) References Cited

U.S. PATENT DOCUMENTS

| | | | | |
|---|---|---|---|---|
| 6,132,903 A | * | 10/2000 | Fujimoto et al. | 429/231.95 |
| 6,797,434 B1 | * | 9/2004 | Matsubara et al. | 429/231.95 |
| 6,800,397 B2 | * | 10/2004 | Okada | 429/231.95 |
| 7,229,718 B2 | * | 6/2007 | Yamaguchi et al. | 429/326 |
| 8,124,276 B2 | | 2/2012 | Watanabe et al. | |
| 2007/0226990 A1 | * | 10/2007 | Morimoto | 29/623.1 |
| 2010/0273045 A1 | | 10/2010 | Hasegawa et al. | |

FOREIGN PATENT DOCUMENTS

| | | | | |
|---|---|---|---|---|
| EP | 2234196 A1 | 9/2010 | | |
| JP | 05307964 A | * 11/1993 | ............. | H01M 6/16 |
| JP | 2002358952 A | 12/2002 | | |
| JP | 2003014670 A | * 1/2003 | ............. | G01N 23/223 |
| JP | 2003119026 A | 4/2003 | | |
| JP | 2003119029 A | 4/2003 | | |
| JP | 2003313520 A | 11/2003 | | |
| JP | 2004259518 A | 9/2004 | | |
| JP | 2005135849 A | * 5/2005 | ............. | H01M 4/58 |
| JP | 2005158643 A | 6/2005 | | |
| JP | 2007149400 A | 6/2007 | | |
| JP | 2008247646 A | 10/2008 | | |
| JP | 2008247648 A | 10/2008 | | |
| WO | 2009078159 A1 | 6/2009 | | |

* cited by examiner

*Primary Examiner* — Nicole M Buie-Hatcher
*Assistant Examiner* — M. Reza Asdjodi
(74) *Attorney, Agent, or Firm* — The Webb Law Firm

(57) ABSTRACT

Provided is a lithium ion battery wherein the content of an iron element contained in a positive electrode active material (measured with an ICP emission spectrophotometer) is 10 ppm or more, and magnetic materials having a size of 0.70 times or greater than the thickness of a separator layer are substantially not included in order to provide a lithium ion battery which has small voltage drop during a charge state or under storage at high temperatures.

2 Claims, 1 Drawing Sheet

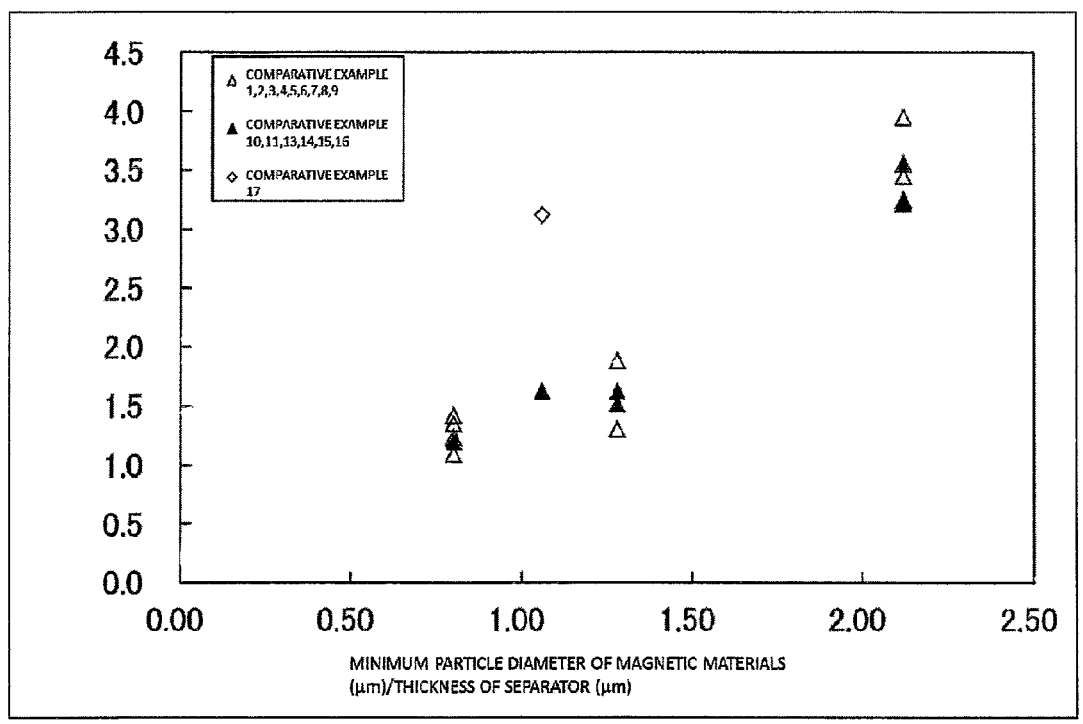

POSITIVE ELECTRODE ACTIVE MATERIAL FOR LITHIUM-ION BATTERY AND LITHIUM-ION BATTERY

TECHNICAL FIELD

The present invention is related to a lithium ion battery, which can be used suitably as a battery that is installed on an electric tool referred to as a power tool, an electric vehicle (EV), a hybrid electric vehicle (HEV) or the like.

TECHNICAL BACKGROUND

Lithium ion batteries, having such characteristics as large energy density and a long life span, are used widely as power sources for home appliances such as video cameras and portable electronic devices such as notebook computers and mobile phones, electric tools such as power tools, and the like, and recently have been put into application in large batteries that are installed in an electric vehicle (EV), a hybrid electric vehicle (HEV) and the like.

A lithium ion battery of such type including a positive electrode, a negative electrode, and an ion conducting layer which is placed between two electrodes. As an ion conducting layer, a separator including a porous film like polyethylene and polypropylene, which is filled with non-aqueous electrolyte liquid, is used.

A separator is a member for separating a positive electrode from a negative electrode in a battery, and by maintaining electrolyte liquid therein, it also plays a role of ensuring ionic conductivity between them. As a separator for a lithium ion battery, an electrochemically inactive porous body (including a porous membrane), that can form a passage for lithium ion conductivity between electrodes by maintaining electrolyte liquid in voids, is used, for example. In general, a microporous polyolefin film containing polyethylene or polypropylene is used.

As a negative electrode active material for constituting a negative electrode, a material capable of intercalating reversibly lithium in ionic state is used. As a negative electrode active material, a carbon material, a silicon oxide series compound like silicone and Si—O, lithium titanate, tin alloy, or a mixture containing such negative electrode material as a main component is generally used, and graphitic carbon materials, pitch cokes, fibrous carbon, or the like are known as an example.

A lithium ion battery is a secondary battery having a structure in which, during charging, lithium is eluted from the positive electrode as ions and moves toward the negative electrode to be stored and conversely, during discharging, the lithium ion returns from the negative electrode to the positive electrode, and it is known that the high energy density of the battery is based on the electric potential of the positive electrode material.

In addition to lithium metal oxides such as $LiCoO_2$ and $LiMnO_2$ having a layer structure, lithium metal oxides having a spinel structure (Fd3-m) of the manganese series such as $LiMn_2O_4$ and $LiNi_{0.5}Mn_{0.5}O_4$ are known as a positive electrode active material used for a lithium ion battery. Among them, since the spinel type lithium metal oxides (herein, it is also referred to as "LMO") of the manganese series have low raw material costs, are free of toxicity, which renders it safe, and furthermore, have properties being strong against overcharging, there is a focus on the spinel type lithium transition metal oxide (LMO) of the manganese series as a next-generation positive electrode active material for a large battery for an electric vehicle (EV), a hybrid electric vehicle (HEV) and the like. In addition, an LMO, which allows three-dimensional insertion and desorption of Li ions, has excellent output characteristics, compared to a lithium transition metal oxide such as $LiCoO_2$, which has a layer structure, such that utilization in applications requiring excellent output characteristics such as tools called power tools, EV and HEV batteries and the like, are anticipated, and thus additional improvement of output characteristics are waited for.

However, there has been a problem about a lithium ion battery that, according to increasing number of charge and discharge, a dendrite grows near a negative electrode during storage at high temperatures, which causes short circuit between electrodes. It is believed that dendrite growth is caused by many reasons, and foreign materials like iron included in a positive electrode active material is considered to be one reason. Specifically, it is believed that foreign materials like iron or stainless steel that is incorporated in a positive electrode material are eluted, precipitated on a negative electrode or the like, and generate a dendrite consequently.

Under the circumstances, to prevent incorporation of foreign materials like iron into a battery material, a method of removing iron by passing a lithium compound or a transition metal compound through magnetic field with pre-determined strength before calcining a mixture containing the lithium compound and transition metal compound is suggested (see Patent Document 1, JP 2003419026 A; Patent Document 2, JP 2003-119029 A; and Patent Document 3, JP 2003-313520 A).

PROBLEM TO BE SOLVED BY THE INVENTION

As described above, it is conventionally aimed to reduce as much as possible the foreign materials included in a positive electrode material, for example, iron. However, if it is intended to lower the content of foreign materials to zero, the positive electrode active material that is essentially required is also removed, and as a result, not only the yield of the positive electrode active material is lowered but also problems in powder characteristics like easily having a lump of a positive electrode material during battery manufacturing due to lowered fluidity of the material are caused.

Further, when layer thickness of a separator layer in a lithium ion battery is reduced, internal resistance of the battery is lowered so that output can be increased. However, at the same time the voltage drop may occur, thus lowering the reliability of the battery.

Under the circumstances, after elucidating those having an influence on voltage drop, and based on the findings obtained accordingly and also based on the view point which is different from reducing as much as possible the foreign materials included in a positive electrode material, the invention is to provide a novel lithium ion battery for obtaining high output or high capacity, which has small voltage drop during charge state or under storage at high temperatures, that is, a lithium ion battery with high reliability.

SUMMARY OF THE INVENTION

To be provided by the invention is a lithium ion battery which is characterized in that the content of iron element contained in a positive electrode active material (measured with an ICP emission spectrophotometer) is 10 ppm or more, and magnetic materials having a size of 0.70 times or greater than the thickness of a separator layer are substantially not included. The method for measuring the amount of magnetic materials is as follows: The positive electrode active material (powder) is subjected to size classification to separate the positive electrode active material having a size of 0.70 times or greater than the thickness of a separator layer, and the separated positive electrode active material (powder), ion exchange water, and a cylindrical stirring bar-type magnet coated with tetrafluoroethylene (a magnet having a magnetic force within the range of 100 mT to 150 mT when measured using TESLA METER Model TM-601 manufactured by KANETEC) are added into a resinous container, which is then placed on a ball mill rotating stage and rotated to produce a slurry. Next, the magnet is taken out, immersed in ion exchange water, and washed with an ultrasonic cleaning apparatus to remove excess powder attached to the magnet. Thereafter, the magnet is taken out, immersed in aqua regia, and heated in the aqua regia at 80° C. for 30 minutes to dissolve the magnetic materials. The aqua regia containing the magnetic materials dissolved therein is analyzed for the amounts of iron, chromium and zinc with an ICP emission spectrophotometer, and, with the total amounts thereof as the amount of magnetic materials, the amount of magnetic materials per weight of the positive electrode active material is calculated.

Also provided by the invention is a positive electrode active material for a lithium ion battery having a positive electrode, a negative electrode, and a separator, in which the lithium ion battery is characterized in that the content of iron element contained in a positive electrode active material (measured with an ICP emission spectrophotometer) is 10 ppm or more, and magnetic materials having a size of 0.70 times or greater than the thickness of a separator layer are substantially not included.

As used herein, the term "magnetic materials" indicate a material like iron or stainless steel which is drawn to a magnet due to its magnetic energy. The expression "amount of magnetic materials is zero" means that the amount of the magnetic materials that are measured according to the method for measuring the amount of magnetic materials as described in the following is below the detection limit.

As a result of the studies by the inventors of the invention, it was found that not all of the impurities included in a positive electrode active material (unintentionally included materials, also referred to as "positive electrode impurities") have an effect on voltage drop of a battery. It was found that, among the positive electrode impurities, like iron and stainless steel, magnetic materials having a size of 0.70 times or greater than the thickness of a separator layer have an effect on voltage drop of a battery, and magnetic materials smaller than those hardly have any effect on voltage drop. Thus, it was found that, by not having magnetic materials having a size of 0.70 times or greater than the thickness of a separator layer (also referred to as "large-size magnetic materials"), voltage drop, in particular, voltage drop during charge state or under storage at high temperatures, can be inhibited. Furthermore, even when layer thickness of a separator layer is reduced, voltage drop can be inhibited by not having large-size magnetic materials, and therefore, voltage drop, in particular, voltage drop during charge state or under storage at high temperatures, can be inhibited while output is increased.

As described above, according to the lithium ion battery and positive electrode active material for a lithium ion battery of the invention, positive electrode active materials that are required are not simultaneously removed like conventional techniques, and therefore decrease in yield of a positive electrode active material can be inhibited and also fluidity decrease of positive electrode active material can be inhibited so that problems in powder characteristics like easily having a lump during battery manufacturing can be solved. Further, thickness of a separator layer can be reduced and output can be increased while ensuring the safety of a battery, and also charge amount of active materials can be increased. Thus, it is particularly suitable as a battery installed in an automobile.

BRIEF DESCRIPTION OF DRAWING

FIG. 1 is a diagram illustrating the measurement value of the samples that are obtained from the Examples and Comparative Examples, in which the horizontal axis represents ratio of minimum particle diameter of magnetic materials compared to thickness of a separator and the vertical axis represents potential deterioration.

BEST MODE(S) FOR CARRYING OUT THE INVENTION

Hereafter, embodiments of the invention will be described. However, the scope of the invention is not to be limited to the embodiments described below.
<Lithium Ion Battery of the Invention>

The lithium ion battery according to this embodiment (also referred to as the "lithium ion battery of the invention") has a positive electrode, a negative electrode, and an ion conducting layer disposed between the two electrodes, and the ion conducting layer needs to have a separator layer and an ion conductor layer.
<Separator Layer>

The separator used for the lithium ion battery of the invention may be appropriately selected from those currently known in the field and used. Examples thereof include a plastic film including a polyester series polymer, a polyolefin series polymer like polyethylene and polypropylene, and an ether series polymer and a porous material including ceramics. Those obtained by laminating different films like polyethylene film and polypropylene film are also included.

However, the invention is not limited to them.

According to the lithium ion battery of the invention, by not including magnetic materials having a size of 0.70 times or greater than the thickness of a separator layer, voltage drop, in particular, voltage drop when being charged or stored at high temperatures, can be inhibited. Thus, as long as the requirement is satisfied, safety of a battery can be surely obtained even when thickness of a separator layer is reduced. As such, thickness of a separator layer is not specifically limited, and a separator currently known in the field may be used. For the lithium ion battery of the invention, for example, it is possible that the separator layer has thickness of 50 µm or less, particularly 30 µm or less, more particularly 20 µm or less, and still more particularly 10 µm or less. However, layer thickness of the separator layer is preferably 1 µm or more.

The number of separators that are disposed between a positive electrode and a negative electrode may be, although not specifically limited, two or three, or more layers may be overlaid and used.

Further, when the separator layer includes plural separator materials, the layer thickness of the separator layer means their total thickness.

Open hole ratio or hole diameter of the separator is not specifically limited, and a separator currently known in the field may be used.
<Ion Conductor Layer>

As for the ion conductor used for the lithium ion battery of the invention, an ion conductor currently known in the field may be used. Examples thereof include organic electrolyte liquid, a polymer solid electrolyte, and molten salts.

Examples of the organic electrolyte liquid include, as a solvent, esters like propylene carbonate, ethylene carbonate (herein below, described as "EC"), butylene carbonate, diethyl carbonate, dimethyl carbonate, methyl ethyl carbonate, and γ-butyrolactone (herein below, described as "GBL"), substituted tetrahydrofurans like tetrahydrofuran, 2-methyl tetrahydrofuran, ethers like dioxolane, diethyl ether, dimethoxy ethane, diethoxy ethane, methoxy ethoxy ethane, dimethyl sulfoxide, sulfolane, methyl sulfolane, acetonitrile, methyl formate, and methyl acetate. It may be used either singly or as a mixture of two or more.

Further, examples of an electrolyte salt dissolved in an organic solvent include lithium salts like lithium perchlorate, lithium borofluoride, lithium hexafluorophosphate (hereinafter, referred to as "$LiPF_6$"), lithium hexafluoroarsenate, lithium trifluoromethane sulfonate, lithium halide, and lithium chloroaluminate.

<Positive Electrode>

Positive electrode of the lithium ion battery of the invention generally has a positive electrode active material (referred to as the "positive electrode active material of the invention") capable of lithium ion doping and dedoping, positive electrode impurities (including magnetic materials), a binder swellable in electrolyte liquid for binding the positive electrode active material of the invention, a conductive assistant for enhancing electron conductivity, and a current collector. However, it is not limited to such constitution.

According to the invention, the positive electrode active material and positive electrode impurities are all together referred to as the "positive electrode materials" or "positive electrode active materials."

(Positive Electrode Active Materials)

Examples of the positive electrode active materials include spinel type (space group Fd-3m) lithium metal oxides, lithium metal oxides with layer structure (space group R-3m), olivine, and a mixture of two or more of them. 5 V spinel type (space group Fd-3m) lithium metal oxides represented by $Li_{1.0}Mn_{1.5}Ni_{0.5}O_4$ and solid solution positive electrode are also included therein.

As used herein, the solid solution positive electrode is a positive electrode active material containing solid solution of $LiMeO_2$ and $Li_2MnO_3$ (Me represents one or more selected from a group consisting of Co, Ni, Nb, V, Mg, Al, and Ti), as represented by $xLi_2MnO_3 \cdot (1-x)LiMeO_2$ ($0.20 \leq x \leq 0.70$, preferably $0.30 \leq X$ or $x \leq 0.60$, and particularly preferably $x \leq 0.55$, and Me represents one or more selected from a group consisting of Co, Ni, Nb, V, Mg, Al, and Ti). It was reported that, when such solid solution positive electrode is used as a positive electrode active material, almost twice as much capacity as $LiCoO_2$ is obtained when charging is carried out at 4.5 V or higher.

Examples of the spinel type (space group Fd-3m) lithium metal oxides as the positive electrode active material include the spinel type (space group Fd-3m) lithium metal oxides that are represented by the formula (1); $Li_{1+x}M_{2-x}O_{4-\delta}$ (with the proviso that, M in the formula is a metal including Mn, Al, and Mg, x is from 0.01 to 0.08, and $0 \leq \delta$).

The maximum particle diameter of the positive electrode active material, that is, maximum particle diameter (Dmax) obtained by the laser diffraction and scattering particle size distribution measurement method, is not particularly limited. Preferably, it is a size of 0.70 times or greater than the thickness of a separator layer.

When positive electrode materials having large particle diameter are uniformly excluded to avoid impurities having large particle diameter, not only the yield of the positive electrode active material is impaired but also fluidity is lowered so that problems in powder characteristics, for example, easily forming a lump during manufacturing an electrode, may occur.

On the contrary, the positive electrode active material which contains a positive active material having size of 0.70 times or greater than the thickness of a separator layer has good fluidity, thus it is unlikely to form a lump during electrode manufacture. Further, having an excellent charging property, it can be used for obtaining high capacity.

The maximum particle diameter (Dmax) of the positive electrode active material, which is obtained by the laser diffraction and scattering particle size distribution measurement method, is preferably 7.0 μm to 130.0 μm, more preferably 14.0 μm to 110.0 μm, and still more preferably 21.0 μm to 70.0 μm, although not specifically limited thereto.

For the lithium metal oxides having a layer structure (space group R-3m) like $LiCoO_2$ and $LiMnO_2$ (also referred to as "LSM"), the maximum particle diameter (Dmax), which is obtained by the laser diffraction and scattering particle size distribution measurement method, is preferably 7.0 μm to 80.0 μm, more preferably 14.0 μm to 50.0 μm, and still more preferably 21.0 μm to 30.0 μm.

Further, for the spinel type (space group Fd-3m) lithium metal oxides (also referred to as "LMO"), the maximum particle diameter (Dmax), which is obtained by the laser diffraction and scattering particle size distribution measurement method, is preferably 20.0 μm to 130.0 μm, more preferably 25.0 μm to 110.0 μm, and still more preferably 50.0 μm to 80.0 μm. The reason is due to the fact that true density varies greatly depending on the difference between LSM and LMO.

By controlling the particle diameter to the above ranges, internal short circuit caused by piercing of a separator by coarse particles can be prevented.

The maximum particle diameter (Dmax) of the positive electrode active material can be controlled by a means using a sieve or size classification using air flow or the like.

The average particle diameter (D50) of the positive electrode active material, which is obtained by the laser diffraction and scattering particle size distribution measurement method, is preferably 2.0 μm to 35.0 μm, more preferably 4.0 μm to 20.0 μm, and still more preferably 5.0 μm to 18.0 μm.

For the lithium metal oxides having a layer structure (space group R-3m) like $LiCoO_2$ and $LiMnO_2$, the average particle diameter (D50), which is obtained by the laser diffraction and scattering particle size distribution measurement method, is preferably 2.0 μm to 20.0 μm, more preferably 3.0 μm to 15.0 μm, and still more preferably 3.0 μm to 10.0 μm.

Further, for the spinel type (space group Fd-3m) lithium metal oxides, the average particle diameter (D50), which is obtained by the laser diffraction and scattering particle size distribution measurement method, is preferably 4.0 μm to 35.0 μm, more preferably 6.0 μm to 20.0 μm, and still more preferably 8.0 μm to 18.0 μm.

The average particle diameter (D50) of the positive electrode active material can be controlled by a means using a sieve or size classification using air flow or the like.

The electrode density of the positive electrode is preferably 2.5 $g/cm^3$ or more, more preferably 2.8 $g/cm^3$ or more, and still more preferably 3.0 $g/cm^3$ or more. The upper limit is, although not specifically limited, 4.0 $g/cm^3$ from the practical point of view.

(Positive Electrode Impurities)

According to the lithium ion battery of the invention, it is important that content of iron element, that is, an iron element like pure iron, iron oxide, and other iron compounds, contained in a positive electrode material is 10 ppm or more.

Thus, the invention is clearly distinguished from a technical idea of removing completely or as much as possible the positive electrode impurities (for example, iron) that are included in a positive electrode material.

Meanwhile, the content of iron element included in a positive electrode material is a value measured by an ICP emission spectrophotometer.

It is also important that the lithium ion battery of the invention substantially does not contain magnetic materials contained in a positive electrode material and having a size of 0.70 times or greater than the thickness of a separator layer when measured according the measurement method described hereinabove.

As a result of various tests, it was found that not all of the positive electrode impurities included in a positive electrode material have an influence on voltage drop of a battery. Instead, it was found that, among the positive electrode impurities, magnetic materials like iron or stainless steel having a size of 0.70 times or greater than the thickness of a separator layer have a significant influence on voltage drop (short circuit) of a battery, in particular voltage drop during charge state or under storage at high temperatures. For such reasons, the lithium ion battery of the invention is intended not to contain substantially magnetic materials having a size of 0.70 times or greater than the thickness of a separator layer.

In other words, when the thickness of a separator layer is 20 μm, magnetic materials having a size of 14 μm or more are not included, that is, their content is zero. Further, the expression "to have substantially zero" means that, when measured by the measurement method described in the following, it is below the detection limit. Considering blank and measurement accuracy or the like, "lower than the detection limit" means less than 10 ppb in this case.

Herein, to measure the content of the magnetic materials having a size of 0.70 times or greater than the thickness of a separator layer, the positive electrode material is passed through a wet type sieve to separate any materials having a size of 0.70 times or greater than the thickness of a separator layer (that is, positive electrode active material and positive electrode impurities), and the content of the magnetic materials included in the separated materials is measured as follows.

Specifically, measurement of an amount of magnetic materials can be performed by adopting a method whereby samples (powders) are turned into slurry along with a magnet coated with tetrafluoroethylene being introduced in the slurry to attach the magnetic materials onto the magnet, then, the magnetic materials attached to the magnet are dissolved in acid to quantify the magnetic materials, by referring to JIS G 1258:1999. Note that, since the magnetic materials attached to the magnet are in tiny amounts, it is necessary to immerse the magnetic materials along with the magnet into the acidic solution for acid dissolution. Thus, it is preferable that a magnet coated with tetrafluoroethylene is used as the magnet, and the strength of each magnet is measured prior to the measurements. The strength of the magnet can be measured using TESLA METER Model TM-601 manufactured by KANETEC.

Specifically, the positive electrode active material (powder) is subjected to size classification to separate the positive electrode active material having a size of 0.70 times or greater than the thickness of a separator layer, and the separated positive electrode active material (powder), ion exchange water, and a cylindrical stirring bar-type magnet coated with tetrafluoroethylene (magnetic force when measured using TESLA METER Model TM-601 manufactured by KANETEC is within the range of 100 mT to 150 mT) are added into a resinous container, which is then placed on a ball mill rotating stage and rotated to produce a slurry. Next, the magnet is taken out, immersed in ion exchange water, and washed with an ultrasonic cleaning apparatus to remove excess powder attached to the magnet. Thereafter, the magnet is taken out, immersed in aqua regia, and heated in aqua regia at 80° C. for 30 minutes to dissolve the magnetic materials. The aqua regia with the magnetic materials dissolved therein is analyzed for the amounts of iron, chromium and zinc with an ICP emission spectrophotometer, and, with the total amounts thereof as the amount of magnetic materials, the amount of magnetic materials per weight of positive electrode active material can be calculated.

In this regard, as for the method relating to "the positive electrode active material (powder) is subjected to size classification to separate the positive electrode active material having a size of 0.70 times or greater than the thickness of a separator layer", for example, 500 g of the positive electrode active material (powder) is weighed and subjected to wet type sieving by using a 1000 cc resinous container with a cover so that the positive electrode active material having a size of 0.70 times or greater than the thickness of a separator layer are separated. Further, thus-separated positive electrode active material (powder), ion exchange water, and a cylindrical stirring bar-type magnet are introduced into a resinous container (for example, 1 liter container having a diameter of 9 cm), and the resinous container itself is placed on a ball mill rotating stage and rotated.

Meanwhile, in order not to contain the magnetic materials having a size of 0.70 times or greater than the thickness of a separator layer, in other words, to have substantially the zero content when measured according to the measurement method described hereinabove, the positive electrode active material powder obtained after calcination followed by pulverization is subjected to magnetic force sorting (also referred to as "magnetic separation") to remove the magnetic materials.

As a method for sorting by magnetic force the positive electrode active material powder, it is desirable to use, for instance, a magnetic force sorter provided with a constitution in which rod-shaped magnets having a magnetic force of 4,000 gauss to 16,000 gauss, in particular 4,000 gauss to 8,000 gauss, are disposed parallelly leaving intervals of 10 mm to 40 mm, and several stages of these are stacked above and below, add the positive electrode active material powder at a loading speed of 0.5 kg/min to 3 kg/min, and perform sorting by magnetic force. However, the invention is not limited to such magnetic force sorter.

Note that, by adjusting the magnetic force of the magnet used, size of the magnetic materials to be removed can be controlled.

In this regard, it is more desirable to add the positive electrode active material powder and perform sorting by magnetic force in such a way that the ratio of total surface area of magnet with respect to the magnetic force sorting distance in the up and down direction is 500 mm$^2$/mm to 1,500 mm$^2$/mm.

Note that the magnetic force sorting distance in the up and down direction is the up and down distance of the space where the magnets are disposed in the magnetic force sorting device.

Since the magnetic materials with a large particle diameter can be also decreased by calcining at high temperatures or calcining with addition of boron, from this point of view, it is still more desirable to control the calcination temperature for producing positive electrode active material in addition to having magnetic separation described above. For example, for a case of spinel type (space group Fd-3m) lithium metal oxides, it is preferable to carry out calcination at 850° C. or more. When electrolytic manganese dioxide is used as a manganese material, the effect is more significant.

Further, since a battery used at high voltage condition has higher possibility of having short circuit, it is preferable that such battery is regulated with a condition of "0.50 times or greater than the thickness of a separator layer" instead of "0.70 times or greater than the thickness of a separator layer" as described above.

In other words, for a battery used in a voltage range which is higher than 4.3 V compared to a lithium counter electrode, it is preferable to use a positive electrode active material which substantially does not include the magnetic materials having a size of 0.5 times or greater than the thickness of a separator layer. As used herein, the meaning of "substantially does not include" and the method for producing the materials are similar to those described above.

Examples of the positive electrode active material which is used for a battery used in a voltage range higher than 4.3 V compared to a lithium counter electrode include 5 V spinel type (space group Fd-3m) lithium metal oxides represented by $Li_{1.0}Mn_{1.5}Ni_{0.5}O_4$, a solid solution positive electrode represented by $xLi_2MnO_3 \cdot (1-x)LiMeO_2$ ($0.20 \leq x \leq 0.70$, preferably $0.30 \leq x$ or $x \leq 0.60$, and particularly preferably $x \leq 0.55$, and Me represents one or more selected from a group consisting of Co, Ni, Nb, V, Mg, Al, and Ti), and lithium metal oxides with layer structure (R-3m). They may be used either singly or in combination or two or more.

Meanwhile, type of the 5 V spinel type (space group Fd-3m) lithium metal oxides or solid solution positive electrode is not specifically limited if it is used for a battery used in a voltage range higher than 4.3 V compared to a lithium counter electrode.

(Binder)

As for the binder which binds the active material and becomes swelled in electrolyte liquid, examples that can be used include polyvinylidene fluoride (PVdF) and a PVdF copolymer resin like copolymer of PVdF and hexafluoropropylene (HFP) or a copolymer of perfluoromethyl vinyl ether (PFMV) and teterafluoroethylene, a fluororesin like polytetrafluoroethylene and fluororubber, a hydrocarbon polymer like styrene-butadiene copolymer and styrene-acrylonitrile copolymer, carboxymethyl cellulose, and a polyimide resin, but not limited thereto. They may be used either singly or in combination or two or more.

(Current Collector)

As for the current collector used for a positive electrode, a material having excellent stability against oxidation is preferably used. Specific examples thereof include aluminum and carbon.

(Conductive Assistant)

Examples of the conductive assistant that can be preferably used include artificial graphite, carbon black (acetylene black), and nickel powder.

<Negative Electrode>

Negative electrode of the lithium ion battery of the invention generally has a negative electrode active material capable of lithium ion doping and dedoping, a binder swellable in electrolyte liquid for binding the negative electrode active material, a conductive assistant for enhancing electron conductivity, and a current collector. However, it is not limited to such constitution.

(Negative Electrode Active Materials)

Examples of the negative electrode active materials include a material which attracts and releases lithium ions, for example, carbon materials, a silicon oxide series compound like silicone and Si—O, lithium titanate, or tin alloy, or those containing the mixture of the negative electrode active materials as a main component.

Examples of the carbon material include a calcined organic polymer compound like polyacrylonitrile, a phenol resin, a phenol Novoloc resin, and cellulose, artificial graphite, and natural graphite.

(Binder)

As for the binder which binds the active material and becomes swelled in electrolyte liquid, examples that can be used include polyvinylidene fluoride (PVdF) and a PVdF copolymer resin like copolymer of PVdF and hexafluoropropylene (HFP) or a copolymer of perfluoromethyl vinyl ether (PFMV) and teterafluoroethylene, a fluororesin like polytetrafluoroethylene and fluororubber, a hydrocarbon polymer like styrene-butadiene copolymer and styrene-acrylonitrile copolymer, carboxymethyl cellulose, and a polyimide resin, but not limited thereto. They may be used either singly or in combination or two or more.

(Current Collector)

As for the current collector used for a negative electrode, a thin foil or a mesh made of a material having excellent stability against reduction is preferably used. Specific examples thereof include metal copper, stainless steel, nickel, and carbon.

(Conductive Assistant)

Examples of the conductive assistant that can be preferably used include artificial graphite, carbon black (acetylene black), and nickel powder.

<Uses>

According to the lithium ion battery of the invention, while having high output, voltage drop, specifically, voltage drop during charge state or under storage at high temperatures, can be inhibited. As such, it can be used suitably as a battery that is installed on an electric tool referred to as a power tool, and a vehicle like an electric vehicle (EV), a hybrid electric vehicle (HEV) or the like.

According to the lithium ion battery of the invention, voltage drop of each cell for constituting a battery, in particular the voltage drop under storage at high temperatures and high voltages, can be inhibited. Further, battery capacity per volume can be increased by decreasing the thickness of a separator layer, and therefore it is particularly useful as a car battery which includes a large size battery like 10 or more cells, particularly 20 or more cells, and more particularly 100 or more cells.

Note that an HEV is a vehicle that uses in combination two sources of driving forces: an electric motor and an internal combustion engine.

In addition, the "lithium ion battery" is meant to include all batteries containing lithium ions inside the battery, such as a lithium secondary battery, a lithium ion battery, and a lithium polymer battery.

In the present specification, when the expression "X to Y" (X and Y are any numbers) is used, unless explicitly mentioned otherwise, the meaning of "X or more but Y or less" is included and at the same time the meaning of "preferably more than X" and "preferably less than Y" is included.

Further, when expressed as "X or more" or "Y or less" (X and Y are any numbers) is used, unless explicitly mentioned otherwise, the meaning of "preferably more than X" or "preferably less than Y" is included.

EXAMPLES

In the following, the invention will be described further based on the Examples. However, the invention is not to be limited to the Examples indicated below.

<Content of Iron Element>

The positive electrode active material was dissolved in aqua regia and the resultant was diluted with ion exchange water. The diluted aqua regia was analyzed using an ICP emission spectrophotometer for quantification of Fe amount.

<Measurement of Average Particle Diameter (D50) and Dmax>

The particle size distributions of the positive electrode active material (powders) or magnetic materials were measured as follows.

Using a sample circulator (trade name: "Microtrac ASVR", manufactured by Nikkiso Co. Ltd.) for laser diffraction particle size distribution meter, sample (powder) was introduced in water, while at a flow rate of 40 mL/sec, the particle size distribution was measured using a laser diffraction particle size distribution meter "HRA (X100)" manufactured by Nikkiso Co. Ltd. to determine D50 and Dmax from the obtained chart of volumetric standard particle size distribution.

Note that when measuring, water passed through a 60 μm filter was used as an aqueous solvent, the solvent refractive index was 1.33, the particle transparency condition was reflective, the measurement range was 0.122 to 704.0 μm, the ultrasonic dispersion (40 W) was carried out for 360 sec, the measurement time was 30 seconds, and the value obtained from one time measurement was used as the measurement value.

<Fabrication of Sample (Battery)>

The positive electrode active material (in the table, it is expressed as "active material" or "active") described in the Table 1, magnetic materials also described in the Table 1, acetylene black (conducting agent, "black" in the table), and polyvinylidene fluoride ("PVDF" in the table) were weighed as described in the Table 1 and mixed with another. By adding 1-methyl-2-pyrrolidone thereto, paste was prepared. The paste was then placed on top of aluminum foil as a current collector and coated thereon by using an applicator having a gap adjusted to 350 μm. After drying overnight under vacuum at 120° C., it was punched to ⌀16 mm and pressed with 4 t/cm² to obtain positive electrode 3. Right before fabrication of a battery, it was dried for 120 minutes or more under vacuum at 120° C. to remove adhered moisture, and then mounted on a battery. Further, average weight of the aluminum foil of ⌀16 mm was obtained in advance and weight of the positive electrode composite was obtained by subtracting the weight of the aluminum foil from the weight of the positive electrode. Further, from the mixing ratio among the positive electrode active material, acetylene black, and PVDF, content of the positive electrode active material was calculated.

Regarding the magnetic materials added, in case of iron powders, the iron powders (product number FE-224500, manufactured by Nilaco, Fe 99%) were subjected to wet type size classification by using four sieves (size of a sieve hole: 53 μm, 32 μm, 20 μm, or 5 μm), and the resultants were suitably selected and used (see, the Table 1).

The "iron powders classified as +53 μm" (that is, the iron powders remained on top of the 53 μm sieve) are expressed to have 53 μm as minimum particle diameter in the tables and graphs. The "iron powders classified as +32 to −53 μm" (that is, the iron powders which passed through the 53 μm sieve but remained on top of the 32 μm sieve) are expressed to have 32 μm as minimum particle diameter. Further, the "iron powders classified as −5 μm" (that is, the iron powders passed through the 5 μm sieve) were also subjected to the particle size distribution measurement as above and Dmin was expressed as the minimum particle diameter.

Further, regarding SUS304, SUS304 (product number 754305, manufactured by Nilaco, Cr 18 mass %, Ni 8 mass %, and Fe for remainder) was subjected to the same size classification as above and used.

Further, the term "None" described in the composition column of the magnetic materials in the Table 1 indicates that no magnetic material has been added.

Metal lithium of ⌀20 mm×thickness 1.0 mm was used as a negative electrode and by using the materials, a cell for electrochemical evaluation, that is, TOMCEL (registered trademark), was produced.

Regarding the electrochemical cell, the positive electrode 3 including the positive electrode composite described above was placed at the center of the inside of lower body 1 made of stainless steel having resistance to organic electrolyte liquid. On top surface of the positive electrode 3, separator 4 having the composition shown in the Table 1 was placed and the separator was fixed by Teflon (registered trademark) spacer 5. Further, on top surface of the separator, negative electrode 6 having lithium metal at lower side is placed and spacer 7 also functioning as a negative electrode terminal was placed, which was covered with the upper side body 2 and tightened with screws to seal the battery.

Regarding the electrolyte liquid, a mixture containing EC and DMC at the volume ratio of 3:7 was used as a solvent, and $LiPF_6$ of 1 mol/L dissolved therein was used as a solute.

(Type of Separator)

Cell guard 2300: three layer structure of PP/PE/PP, open hole ratio of 37%, hole size (μm×μm) 0.041×0.096

Cell guard 2400: monolayer structure of PP, open hole ratio of 35%, hole size (μm×μm) 0.41×0.12

Cell guard 2500: monolayer structure of PP, open hole ratio of 42%, hole size (μm×μm) 0.053×0.20

<Test for Potential Deterioration>

By using the battery fabricated as above, a test for potential deterioration was carried out.

Charging and discharging were repeated twice at 25° C. within the electrode potential range of from 3.0 to 4.3 V. Thereafter, charging to 4.3 V was carried out, and after taking the battery out from the device, the potential was measured. Subsequently, the battery in charged state was placed in an incubator having the temperature given in the Table 2 and stored for days as described in the Table 2. After maintaining the battery following the storage for 3 hours at room temperature, the potential was measured again.

Meanwhile, for the Examples 6, 19 and Reference example 5, the battery was charged to 4.5 V and stored. For the Examples 7, 21 and Reference example 6, the battery was charged to 5.2 V and stored.

TABLE 1

| | Active material | | | | Magnetic materials | | | | Minimum particle diameter μm | Positive electrode (mass ratio) Active:Impurities:Black:PVDF | Separator | | |
|---|---|---|---|---|---|---|---|---|---|---|---|---|---|
| | Composition | Dmax μm | D50 μm | Fe content ppm | Composition | D50 μm | Dmax μm | Particle size distribution | | | Composition | Number of pieces | Layer thickness (μm) |
| Reference Example 7 | $Li_{1.03}Mn_{0.33}Co_{0.33}Ni_{0.33}O_2$ | 9.3 | 2.3 | 10 | None | — | — | — | — | 80:0:10:10 | Cell guard 2500 | 1 | 25 |
| Example 2 | $Li_{1.06}Ni_{0.56}Mn_{0.19}Co_{0.19}O_2$ | 80.0 | 8.2 | 30 | None | — | — | — | — | 80:0:10:10 | Cell guard 2500 | 1 | 25 |
| Example 3 | $Li_{1.03}Ni_{0.52}Mn_{0.26}Co_{0.19}O_2$ | 57.1 | 9.7 | 40 | None | — | — | — | — | 80:0:10:10 | Cell guard 2300 | 1 | 25 |
| Example 4 | $Li_{1.06}Mn_{1.903}Mg_{0.037}O_4$ | 104.7 | 24.4 | 100 | None | — | — | — | — | 80:0:10:10 | Cell guard 2300 | 1 | 25 |
| Example 5 | $(Li_{1.03}Mn_{1.833}Mg_{0.06}Al_{0.08}O_4)\text{-}B_{0.06}$ | 62.2 | 14.3 | 50 | None | — | — | — | — | 80:0:10:10 | Cell guard 2300 | 1 | 25 |
| Example 6 | $Li(Li_{0.2}Ni_{0.17}Mn_{0.56}Co_{0.07})O_2$ | 62.2 | 8.5 | 50 | None | — | — | — | — | 80:0:10:10 | Cell guard 2500 | 1 | 25 |
| Example 7 | $Li_{1.01}Mn_{1.54}Ni_{0.45}O_4$ | 74.0 | 16.6 | 40 | None | — | — | — | — | 80:0:10:10 | Cell guard 2300 | 1 | 25 |
| Example 8 | $Li_{1.06}Mn_{1.903}Mg_{0.037}O_4$ | 104.7 | 24.4 | 10 | Iron components | 9.6 | 44.0 | −5 μm | 3.9 | 79:1:10:10 | Cell guard 2300 | 1 | 25 |
| Example 9 | $Li_{1.06}Mn_{1.903}Mg_{0.037}O_4$ | 104.7 | 24.4 | 10 | SUS304 | 8.5 | 37.0 | −5 μm | 1.8 | 79:1:10:10 | Cell guard 2500 | 1 | 25 |
| Reference Example 8 | $Li_{1.03}Mn_{0.33}Co_{0.33}Ni_{0.33}O_2$ | 9.3 | 2.3 | 50 | Iron components | 31.3 | 124.5 | +20~ −32 μm | 20.0 | 79:1:10:10 | Cell guard 2500 | 2 | 50 |
| Reference Example 1 | $Li_{1.03}Mn_{0.33}Co_{0.33}Ni_{0.33}O_2$ | 9.3 | 2.3 | 50 | Iron components | 55.1 | 176.0 | +32~ −53 μm | 32.0 | 79:1:10:10 | Cell gaurd 2300 | 2 | 50 |
| Reference Example 9 | $Li_{1.03}Mn_{0.33}Co_{0.33}Ni_{0.33}O_2$ | 9.3 | 2.3 | 100 | Iron components | 31.3 | 124.5 | +20~ −32 μm | 20.0 | 79:1:10:10 | Cell guard 2300 | 2 | 50 |
| Reference Example 2 | $Li_{1.03}Mn_{0.33}Co_{0.33}Ni_{0.33}O_2$ | 9.3 | 2.3 | 100 | Iron components | 55.1 | 176.0 | +32~ −53 μm | 32.0 | 79:1:10:10 | Cell gaurd 2500 | 2 | 50 |
| Example 14 | $Li_{1.06}Ni_{0.56}Mn_{0.19}Co_{0.19}O_2$ | 80.0 | 8.2 | 30 | Iron components | 31.3 | 124.5 | +20~ −32 μm | 20.0 | 79:1:10:10 | Cell guard 2300 | 2 | 50 |
| Reference Example 3 | $Li_{1.03}Ni_{0.52}Mn_{0.26}Co_{0.19}O_2$ | 57.1 | 9.7 | 40 | Iron components | 55.1 | 176.0 | +32~ −53 μm | 32.0 | 79:1:10:10 | Cell gaurd 2500 | 2 | 50 |
| Example 16 | $(Li_{1.03}Mn_{1.083}Mg_{0.06}Al_{0.08}O_4)\text{-}B_{0.06}$ | 62.2 | 14.3 | 50 | Iron components | 9.6 | 44.0 | −5 μm | 5.0 | 79:1:10:10 | Cell guard 2300 | 1 | 25 |
| Example 17 | $(Li_{1.03}Mn_{1.833}Mg_{0.06}Al_{0.08}O_4)\text{-}B_{0.06}$ | 62.2 | 14.3 | 50 | SUS304 | 8.5 | 37.0 | −5 μm | 1.8 | 79:1:10:10 | Cell guard 2500 | 1 | 25 |
| Reference Example 4 | $Li_{1.06}Mn_{1.903}Mg_{0.037}O_4$ | 104.7 | 24.4 | 50 | Iron components | 55.1 | 176.0 | +32~ −53 μm | 32.0 | 79:1:10:10 | Cell guard 2300 | 2 | 50 |
| Example 19 | $Li(Li_{0.2}Ni_{0.17}Mn_{0.56}Co_{0.07})O_2$ | 62.2 | 8.5 | 50 | Iron components | 9.6 | 44.0 | −5 μm | 3.9 | 79:1:10:10 | Cell guard 2300 | 1 | 25 |
| Reference Example 5 | $Li(Li_{0.2}Ni_{0.17}Mn_{0.56}Co_{0.07})O_2$ | 62.2 | 8.5 | 50 | Iron components | 55.1 | 176.0 | +32~ −53 μm | 32.0 | 79:1:10:10 | Cell guard 2300 | 2 | 50 |
| Example 21 | $Li_{1.01}Mn_{1.54}Ni_{0.45}O_4$ | 74.0 | 16.6 | 40 | Iron components | 9.6 | 44.0 | −5 μm | 3.9 | 79:1:10:10 | Cell guard 2300 | 1 | 25 |
| Reference Example 6 | $Li_{1.01}Mn_{1.54}Ni_{0.45}O_4$ | 74.0 | 16.6 | 40 | Iron components | 55.1 | 176.0 | +32~ −53 μm | 32.0 | 79:1:10:10 | Cell gaurd 2300 | 2 | 50 |

TABLE 1-continued

| | Active material | | | | Magnetic materials | | | | Positive electrode (mass ratio) | Separator | | |
|---|---|---|---|---|---|---|---|---|---|---|---|---|
| | Composition | Dmax μm | D50 μm | Fe content ppm | Composition | D50 μm | Dmax μm | Particle size distribution | Minimum particle diameter μm | Active:Impurities:Black:PVDF | Composition | Number of pieces | Layer thickness (μm) |
| Comparative Example 1 | $Li_{1.03}Mn_{0.33}Co_{0.33}Ni_{0.33}O_2$ | 9.3 | 2.3 | 50 | Iron components | 31.3 | 124.5 | +20~−32 μm | 20.0 | 79:1:10:10 | Cell guard 2300 | 1 | 25 |
| Comparative Example 2 | $Li_{1.03}Mn_{0.33}Co_{0.33}Ni_{0.33}O_2$ | 9.3 | 2.3 | 100 | Iron components | 55.1 | 176.0 | +32~−53 μm | 32.0 | 79:1:10:10 | Cell guard 2400 | 1 | 25 |
| Comparative Example 3 | $Li_{1.03}Mn_{0.33}Co_{0.33}Ni_{0.33}O_2$ | 9.3 | 2.3 | 50 | Iron components | 31.3 | 124.5 | +20~−32 μm | 20.0 | 79:1:10:10 | Cell guard 2400 | 1 | 25 |
| Comparative Example 4 | $Li_{1.03}Mn_{0.33}Co_{0.33}Ni_{0.33}O_2$ | 9.3 | 2.3 | 100 | Iron components | 55.1 | 176.0 | +32~−53 μm | 32.0 | 79:1:10:10 | Cell guard 2500 | 1 | 25 |
| Comparative Example 5 | $Li_{1.03}Mn_{0.33}Co_{0.33}Ni_{0.33}O_2$ | 9.3 | 2.3 | 50 | Iron components | 31.3 | 124.5 | +20~−32 μm | 20.0 | 79:1:10:10 | Cell guard 2500 | 1 | 25 |
| Comparative Example 6 | $Li_{1.03}Mn_{0.33}Co_{0.33}Ni_{0.33}O_2$ | 9.3 | 2.3 | 10 | SUS304 | 94.1 | 352.0 | +53 μm | 53.0 | 79:1:10:10 | Cell guard 2500 | 1 | 25 |
| Comparative Example 7 | $Li_{1.06}Ni_{0.56}Mn_{0.19}Co_{0.19}O_2$ | 80.0 | 8.2 | 30 | Iron components | 31.3 | 124.5 | +20~−32 μm | 20.0 | 79:1:10:10 | Cell guard 2500 | 1 | 25 |
| Comparative Example 8 | $Li_{1.06}Ni_{0.56}Mn_{0.19}Co_{0.19}O_2$ | 80.0 | 8.2 | 30 | SUS304 | 94.1 | 352.0 | +53 μm | 53.0 | 79:1:10:10 | Cell guard 2500 | 1 | 25 |
| Comparative Example 9 | $Li_{1.06}Ni_{0.56}Mn_{0.19}Co_{0.19}O_2$ | 57.1 | 9.7 | 40 | SUS304 | 94.1 | 352.0 | +53 μm | 53.0 | 79:1:10:10 | Cell guard 2500 | 1 | 25 |
| Comparative Example 10 | $Li_{1.06}Mn_{1.903}Mg_{0.037}O_4$ | 104.7 | 24.4 | 10 | Iron components | 55.1 | 176.0 | +32~−53 μm | 32.0 | 79:1:10:10 | Cell guard 2300 | 1 | 25 |
| Comparative Example 11 | $Li_{1.06}Mn_{1.903}Mg_{0.037}O_4$ | 104.7 | 24.4 | 50 | Iron components | 31.3 | 124.5 | +20~−32 μm | 20.0 | 79:1:10:10 | Cell guard 2300 | 1 | 25 |
| Comparative Example 13 | $Li_{1.06}Mn_{1.903}Mg_{0.037}O_4$ | 104.7 | 24.4 | 10 | SUS304 | 94.1 | 352.0 | +53 μm | 53.0 | 79:1:10:10 | Cell guard 2500 | 1 | 25 |
| Comparative Example 14 | $Li_{1.06}Mn_{1.903}Mg_{0.037}O_4$ | 104.7 | 24.4 | 50 | SUS304 | 94.1 | 352.0 | +53 μm | 53.0 | 79:1:10:10 | Cell guard 2500 | 2 | 50 |
| Comparative Example 15 | $Li_{1.06}Mn_{1.903}Mg_{0.037}O_4$ | 104.7 | 24.4 | 50 | SUS304 | 53.8 | 176.0 | +32~−53 μm | 32.0 | 79:1:10:10 | Cell guard 2500 | 1 | 25 |
| Comparative Example 16 | $(Li_{1.03}Mn_{1.833}Mg_{0.06}Al_{0.08}O_4)B_{0.0}^{6-}$ | 104.7 | 24.4 | 50 | SUS304 | 94.1 | 352.0 | +53 μm | 53.0 | 79:1:10:10 | Cell guard 2500 | 1 | 25 |
| Comparative Example 17 | $Li_{1.01}Mn_{1.54}Ni_{0.45}O_4$ | 74 | 16.6 | 40 | SUS304 | 94.1 | 352.0 | +53 μm | 53.0 | 79:1:10:10 | Cell guard 2300 | 2 | 50 |

TABLE 2

| | | Number of storage days | Active material Dmax/Thickness of separator | Minimum particle diameter of magnetic materials/Thickness of separator | Potential deterioration (V) |
|---|---|---|---|---|---|
| Comparative Example 1 | $Li_{1.03}Mn_{0.33}Co_{0.33}Ni_{0.33}O_2$ | 55° C. × 30 Day | 0.37 | 0.80 | 1.42 |
| Comparative Example 2 | $Li_{1.03}Mn_{0.33}Co_{0.33}Ni_{0.33}O_2$ | 55° C. × 30 Day | 0.37 | 1.28 | 1.88 |
| Comparative Example 3 | $Li_{1.03}Mn_{0.33}Co_{0.33}Ni_{0.33}O_2$ | 55° C. × 30 Day | 0.37 | 0.80 | 1.09 |
| Comparative Example 4 | $Li_{1.03}Mn_{0.33}Co_{0.33}Ni_{0.33}O_2$ | 55° C. × 30 Day | 0.37 | 1.28 | 1.30 |
| Comparative Example 5 | $Li_{1.03}Mn_{0.33}Co_{0.33}Ni_{0.33}O_2$ | 55° C. × 30 Day | 0.37 | 0.80 | 1.24 |

TABLE 2-continued

| | | | | | |
|---|---|---|---|---|---|
| Comparative Example 6 | $Li_{1.03}Mn_{0.33}Co_{0.33}Ni_{0.33}O_2$ | 55° C. × 30 Day | 0.37 | 2.12 | 3.95 |
| Comparative Example 7 | $Li_{1.06}Ni_{0.56}Mn_{0.19}Co_{0.19}O_2$ | 55° C. × 30 Day | 3.20 | 0.80 | 1.35 |
| Comparative Example 8 | $Li_{1.06}Ni_{0.56}Mn_{0.19}Co_{0.19}O_2$ | 55° C. × 30 Day | 3.20 | 2.12 | 3.45 |
| Comparative Example 9 | $Li_{1.03}Ni_{0.52}Mn_{0.26}Co_{0.19}O_2$ | 55° C. × 30 Day | 2.28 | 2.12 | 3.25 |
| Comparative Example 10 | $Li_{1.06}Mn_{1.903}Mg_{0.037}O_4$ | 55° C. × 30 Day | 4.19 | 1.28 | 1.62 |
| Comparative Example 11 | $Li_{1.06}Mn_{1.903}Mg_{0.037}O_4$ | 55° C. × 30 Day | 4.19 | 0.80 | 1.20 |
| Comparative Example 13 | $Li_{1.06}Mn_{1.903}Mg_{0.037}O_4$ | 55° C. × 30 Day | 4.19 | 2.12 | 3.22 |
| Comparative Example 14 | $Li_{1.06}Mn_{1.903}Mg_{0.037}O_4$ | 55° C. × 30 Day | 2.09 | 1.06 | 1.62 |
| Comparative Example 15 | $Li_{1.06}Mn_{1.903}Mg_{0.037}O_4$ | 55° C. × 30 Day | 4.19 | 1.28 | 1.52 |
| Comparative Example 16 | $(Li_{1.03}Mn_{1.833}Mg_{0.06}Al_{0.08}O_4)B_{0.06}$ | 55° C. × 30 Day | 4.19 | 2.12 | 3.56 |
| Comparative Example 17 | $Li_{1.01}Mn_{1.54}Ni_{0.45}O_4$ | 55° C. × 30 Day | 1.48 | 1.06 | 3.13 |

| | | Number of storage days | Active material Dmax/Thickness of separator | Particle size distribution | Separator Layer thickness (μm) | Potential deterioration (V) |
|---|---|---|---|---|---|---|
| Reference Example 7 | $Li_{1.03}Mn_{0.33}Co_{0.33}Ni_{0.33}O_2$ | 55° C. × 30 Day | 0.37 | — | 25 | 0.14 |
| Example 2 | $Li_{1.06}Ni_{0.56}Mn_{0.19}Co_{0.19}O_2$ | 55° C. × 30 Day | 3.20 | — | 25 | 0.19 |
| Example 3 | $Li_{1.03}Ni_{0.52}Mn_{0.26}Co_{0.19}O_2$ | 55° C. × 30 Day | 2.28 | — | 25 | 0.13 |
| Example 4 | $Li_{1.06}Mn_{1.903}Mg_{0.037}O_4$ | 55° C. × 30 Day | 4.19 | — | 25 | 0.08 |
| Example 5 | $(Li_{1.03}Mn_{1.833}Mg_{0.06}Al_{0.08}O_4)B_{0.06}$ | 55° C. × 30 Day | 2.49 | — | 25 | 0.30 |
| Example 6 | $Li(Li_{0.2}Ni_{0.17}Mn_{0.56}Co_{0.07})O_2$ | 55° C. × 30 Day | 2.49 | — | 25 | 0.38 |
| Example 7 | $Li_{1.01}Mn_{1.54}Ni_{0.45}O_4$ | 55° C. × 30 Day | 2.96 | — | 25 | 0.42 |
| Example 8 | $Li_{1.06}Mn_{1.903}Mg_{0.037}O_4$ | 55° C. × 30 Day | 4.19 | −5 μm | 25 | 0.23 |
| Example 9 | $Li_{1.06}Mn_{1.903}Mg_{0.037}O_4$ | 55° C. × 30 Day | 4.19 | −5 μm | 25 | 0.34 |
| Reference Example 8 | $Li_{1.03}Mn_{0.33}Co_{0.33}Ni_{0.33}O_2$ | 55° C. × 30 Day | 0.19 | +20~−32 μm | 50 | 0.27 |
| Reference Example 1 | $Li_{1.03}Mn_{0.33}Co_{0.33}Ni_{0.33}O_2$ | 55° C. × 30 Day | 0.19 | +32~−53 μm | 50 | 0.32 |
| Reference Example 9 | $Li_{1.03}Mn_{0.33}Co_{0.33}Ni_{0.33}O_2$ | 55° C. × 30 Day | 0.19 | +20~−32 μm | 50 | 0.52 |
| Reference Example 2 | $Li_{1.03}Mn_{0.33}Co_{0.33}Ni_{0.33}O_2$ | 55° C. × 30 Day | 0.19 | +32~−53 μm | 50 | 0.48 |
| Example 14 | $Li_{1.06}Ni_{0.56}Mn_{0.19}Co_{0.19}O_2$ | 55° C. × 30 Day | 1.60 | +20~−32 μm | 50 | 0.43 |
| Reference Example 3 | $Li_{1.03}Ni_{0.52}Mn_{0.26}Co_{0.19}O_2$ | 55° C. × 30 Day | 1.14 | +32~−53 μm | 50 | 0.58 |
| Example 16 | $(Li_{1.03}Mn_{1.833}Mg_{0.06}Al_{0.08}O_4)B_{0.06}$ | 55° C. × 30 Day | 2.49 | −5 μm | 25 | 0.25 |
| Example 17 | $(Li_{1.03}Mn_{1.833}Mg_{0.06}Al_{0.08}O_4)B_{0.06}$ | 55° C. × 30 Day | 2.49 | −5 μm | 25 | 0.32 |
| Reference Example 4 | $Li_{1.06}Mn_{1.903}Mg_{0.037}O_4$ | 55° C. × 30 Day | 2.09 | +32~−53 μm | 50 | 0.51 |
| Example 19 | $Li(Li_{0.2}Ni_{0.17}Mn_{0.56}Co_{0.07})O_2$ | 55° C. × 30 Day | 2.49 | −5 μm | 25 | 0.41 |
| Reference Example 5 | $Li(Li_{0.2}Ni_{0.17}Mn_{0.56}Co_{0.07})O_2$ | 55° C. × 30 Day | 1.24 | +32~−53 μm | 50 | 0.53 |
| Example 21 | $Li_{1.01}Mn_{1.54}Ni_{0.45}O_4$ | 55° C. × 30 Day | 2.96 | −5 μm | 25 | 0.43 |
| Reference Example 6 | $Li_{1.01}Mn_{1.54}Ni_{0.45}O_4$ | 55° C. × 30 Day | 1.48 | +32~−53 μm | 50 | 0.49 |

(Discussion)

It was found that voltage drop of a battery is caused by adding iron or stainless steel having a size of 0.70 times or greater than the thickness of a separator layer, however, addition of magnetic materials having a size smaller than those has almost no effect on the voltage drop.

Thus, it was determined that, by not including large-size magnetic particles having a size of 0.70 time or greater than the thickness of a separator layer, voltage drop, in particular voltage drop during charge state or under storage at high temperatures, can be inhibited.

Regarding the separator, physical properties other than thickness (for example, open hole ratio, permeability, hole diameter, and density) were also examined. However, their relation with short circuit was not observed. For example, at least the same results were obtained for a separator which has open hole ratio and hole diameter that are within in the range of 30 to 45% and 0.01 μm to 0.3 μm respectively.

Further, for a positive electrode material used for a high voltage battery, in particular a battery used in a voltage range which is higher than 4.3 V compared to a lithium counter electrode, it is more likely to have short circuit, and therefore in case of a solid solution positive electrode like those of the Examples 6 and 19 or 5 V spinel type (space group Fd-3m) lithium metal oxides like those of the Examples 7 and 21, not including the magnetic materials having a size of 0.5 times or greater than the thickness of a separator layer is believed to be more preferable.

The invention claimed is:

1. A lithium ion battery comprising positive electrode active material and a separator layer, wherein the content of iron contained in the positive electrode active material, when measured with an ICP emission spectrophotometer, is 10 ppm or more;

the content of the magnetic materials having a size of 0.70 times or greater than the thickness of a separator layer is zero when measured according to the following measurement method:

the maximum particle diameter (Dmax) of the positive electrode active material is 0.70 times or greater than the thickness of a separator layer, the positive electrode active material is subjected to size classification to separate the positive electrode active material having a size of 0.70 times or greater than the thickness of a separator layer, and the separated positive electrode active material, ion exchange water, and a cylindrical stirring bar-type magnet coated with tetrafluoroethylene are added into a resinous container, which is then placed on a ball mill rotating stage and rotated to produce a slurry; the magnet is taken out, immersed in ion exchange water, and washed with an ultrasonic cleaning apparatus to remove excess powder attached to the magnet; the magnet is taken out, immersed in aqua regia, and heated in the aqua regia at 80° C. for 30 minutes to dissolve the magnetic materials; the aqua regia containing the magnetic materials dissolved therein is analyzed for the amounts of iron, chromium and zinc with an ICP emission spectrophotometer, and, with the total amounts thereof as the amount of magnetic materials, the amount of magnetic materials per weight of the positive electrode active material is calculated.

2. The lithium ion battery according to claim 1, wherein the positive electrode active material is spinel type lithium transition metal oxides, lithium transition metal oxides with layer structure, or olivine, or a mixture of two or more thereof.

* * * * *